United States Patent
Harrison

(10) Patent No.: US 9,138,826 B2
(45) Date of Patent: Sep. 22, 2015

(54) METHOD FOR LASER MARKING A METAL SURFACE WITH A DESIRED COLOUR

(71) Applicant: SPI Lasers UK Limited, Hedge End (GB)

(72) Inventor: Paul Martin Harrison, East Grinstead (GB)

(73) Assignee: SPI Lasers UK Ltd., Southampton (GB)

(*) Notice: Subject to any disclaimer, the term of this patent is extended or adjusted under 35 U.S.C. 154(b) by 91 days.

(21) Appl. No.: 13/712,154

(22) Filed: Dec. 12, 2012

(65) Prior Publication Data

US 2014/0147694 A1 May 29, 2014

(30) Foreign Application Priority Data

Nov. 24, 2012 (GB) .................................. 1221184.3

(51) Int. Cl.
*B23K 26/12* (2014.01)
*B23K 26/00* (2014.01)
*B41M 5/26* (2006.01)

(52) U.S. Cl.
CPC .......... *B23K 26/0081* (2013.01); *B23K 26/0012* (2013.01); *B23K 26/0015* (2013.01); *B23K 26/0084* (2013.01); *B41M 5/262* (2013.01); *B23K 2203/14* (2013.01); *Y10T 428/12389* (2015.01)

(58) Field of Classification Search
CPC .......... B41J 2/435; G01D 9/42; B23K 26/00; B23K 26/0012; B23K 26/0015; B23K 26/0009; B23K 26/0084; B23K 26/0054; B23K 26/0066; C08J 7/18; C21D 1/00
USPC .......... 219/121.85, 121.68, 121.69, 121.76; 427/554, 555; 148/565; 346/107.1; 347/232
See application file for complete search history.

(56) References Cited

U.S. PATENT DOCUMENTS

| | | | | |
|---|---|---|---|---|
| 5,632,916 | A * | 5/1997 | Lappalainen et al. | ... 219/121.85 |
| 6,819,972 | B1 * | 11/2004 | Martin et al. | ................. 700/166 |
| 6,855,910 | B2 * | 2/2005 | Harrison | ................. 219/121.85 |
| 7,594,613 | B2 * | 9/2009 | Sato et al. | ..................... 235/494 |
| 2011/0194574 | A1 * | 8/2011 | Zhang et al. | ..................... 372/25 |
| 2011/0315667 | A1 * | 12/2011 | Reichenbach et al. | ... 219/121.78 |

FOREIGN PATENT DOCUMENTS

EP 1123772 * 12/2006
WO WO9847035 A1 * 10/1998

* cited by examiner

*Primary Examiner* — Dana Ross
*Assistant Examiner* — Michael Laflame, Jr.
(74) *Attorney, Agent, or Firm* — Iandiorio Teska & Coleman, LLP

(57) ABSTRACT

A method for laser marking a metal surface (5) with a desired color, which method comprises forming at least one first pattern (41) on the metal surface (5) with a first laser beam (42) having a first pulse fluence (43), forming at least one second pattern (51) on the metal surface with a second laser beam (52) having a second pulse fluence (53), characterized by causing the second pattern (51) to overlay the first pattern (41), arranging the first pulse fluence (43) to be at least five times greater than the second pulse fluence (53), the color being given by the first and second pulse fluences (43, 53) and spot spacings (48) in the first and second patterns (41, 51), and selecting the first and second pulse fluences (43, 53) and the spot spacings (48) to form the desired color.

22 Claims, 3 Drawing Sheets

METHOD FOR LASER MARKING A METAL SURFACE WITH A DESIRED COLOUR

FIELD OF INVENTION

This invention relates to a method for laser marking a metal surface with a desired colour. The invention has particular application for the colour marking of non-anodized metal surfaces without the use of dyes, inks or other chemicals.

BACKGROUND TO THE INVENTION

The use of dyes, inks and other chemicals in the colour marking of commercial, consumer and industrial goods places important requirements on supply chains, logistics and the environment. Processes that can colour mark without the use of dyes, inks or other chemicals can therefore provide a distinct advantage.

Laser colour marking has been applied to many materials including metals. Once perfected for a particular material, the laser marking process is typically reliable, repeatable, and amenable to high-throughput high-yield production. An example is the colour marking of anodized aluminum, a material that is in widespread use as it is lightweight, strong, easily shaped, and has a durable surface finish. The anodized surface is generally dyed with coloured dyes. However it is also possible to laser mark anodized aluminum without the use of dyes, inks or other chemicals. Laser light can be used directly to form various colours either within the anodization or in the interface region between the oxide layer that forms the anodization and the aluminum. Similar marks can also be made on other anodized metal surfaces such as titanium, zinc, magnesium, niobium and tantalum.

Copper metal is not readily anodized. Laser marking that relies on an oxide layer is therefore difficult or impossible in copper and alloys such as brass and bronze. Laser marking has been achieved with laser ablation of copper and its alloys to produce colours such as white, black, brown and yellow. However it is not been possible to produce colours such as pink, blue, tangerine, purple, light brown, grey, and orange other than with dyes, inks or with a combination of chemicals and laser marking.

There is a need for a method for laser marking a metal surface with a desired colour that avoids the aforementioned problems.

THE INVENTION

According to a non-limiting embodiment of the present invention there is provided a method for laser marking a metal surface with a desired colour, which method comprises forming at least one first pattern on the metal surface with a first laser beam having a first pulse fluence, forming at least one second pattern on the metal surface with a second laser beam having a second pulse fluence, characterized by: causing the second pattern to overlay the first pattern; arranging the first pulse fluence to be at least five times greater than the second pulse fluence; the colour being given by the first and second pulse fluences and spot spacings in the first and second patterns; and selecting the first and second pulse fluences and the spot spacings to form the desired colour.

The method is particularly attractive because it is able to produce colours on metal surfaces that have never been produced by laser marking before. Preferably the new colours are pink, blue, tangerine, purple, light brown, grey, and orange. If desired, the method of the present invention may be used to produce colours such as white, yellow, brown or black and which are achievable by known laser marking methods for marking a metal surface.

The first pulse fluence may be selected such that the first laser beam melts the metal surface.

The metal surface may be a surface of an alloy. The alloy may include copper. The alloy may be selected from tin bronze, phosphor bronze, aluminum bronze, brass, gunmetal, leaded gunmetal, nickel gunmetal, copper-nickel, nickel silver, and beryllium copper.

The metal surface may be anodized or non-anodized.

The first laser beam may be characterized by a pulse width. The pulse width may be less than ten microseconds. The pulse width may be greater than one hundred picoseconds. A pulse width greater than one hundred picoseconds helps to ensure that the first laser beam melts the metal surface rather than just ablates it.

The first laser beam may have a peak power greater than 1 kW.

The second laser beam may have a peak power greater than 100 W.

The method may include the step of forming at least one of the first pattern and the second pattern more than once.

The method of the invention may include forming at least one third pattern. The method may include the step of forming the third pattern on the metal surface with a third laser beam having a third pulse fluence. The third pulse fluence may be less than the second pulse fluence.

The first and the second patterns may be characterized respectfully by a first and a second spot to spot spacing, and a first and a second line to line spacing. The first line to line spacing may be greater than the second line to line spacing.

At least one of the first and the second patterns may comprise hatching. Alternatively or additionally, at least one of the first and the second patterns may comprise a spiral.

The desired colour may be pink, blue, tangerine, purple, light brown, grey, or orange.

The first and second patterns may be characterised by a first and second axis. The first axis may be in a different direction from the second axis. The first axis may be rotated from the second axis by an angle between 15° and 75°. Rotating these axes can help prevent aliasing between the first and the second patterns and can thus provide a more consistent mark.

The present invention also provides an article when marked according to the method of the invention. Examples of articles are: signs and name plates for houses, machinery, or offices; house numbers; jewelry including bracelets used for medical conditions; coins; and metal work for ships, yachts and pleasure boats. The articles may be made from copper or alloys of copper.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 1:
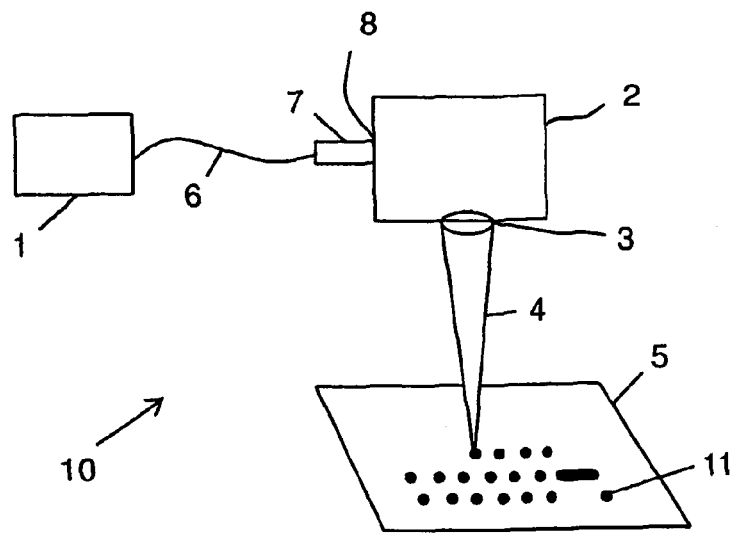
FIG. 1 shows apparatus according to the present invention.

FIG. 1 shows a laser based workstation 10, which comprises at least one laser 1, a scanning means 2, and an objective lens 3. The scanning means 2 moves a laser beam 4 with respect to a metal surface 5. The scanning means 2 can be a scanner, such as the galvanometric scan head shown in FIG. 1. Alternatively or additionally, the scanning means 2 can be a moveable two-dimensional or three-dimensional translation stage, or a robot arm. In FIG. 1, the laser beam 4 is shown being delivered to the scanning means 2 via an optical fibre cable 6, an input collimator 7 and the scanning means 2. The input collimator 7 expands and collimates the laser beam 4 and inputs the laser beam 4 into the scanning means 2 via an input aperture 8. The laser beam 4 is then focused onto the metal surface 5 by the objective lens 3 whereupon a mark 11 is formed.

The laser 1 can be a fibre laser, a solid state rod laser, a solid state disk laser, or a gas laser such as a carbon dioxide laser. For marking applications, the laser 1 would preferably be a pulsed laser.

Figure 2:
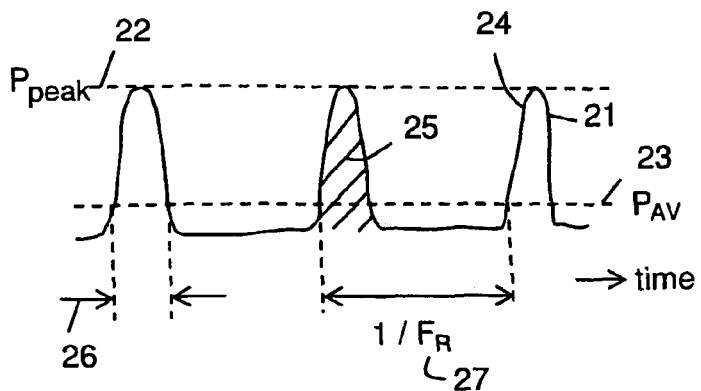
FIG. 2 shows a pulsed laser waveform.

As shown with reference to FIG. 2, a pulsed laser outputs a series of pulses 21 characterized by a peak power 22, an average power 23, a pulse shape 24, a pulse energy 25, a pulse width 26, and a pulse repetition frequency $F_R$ 27.

Figure 3:
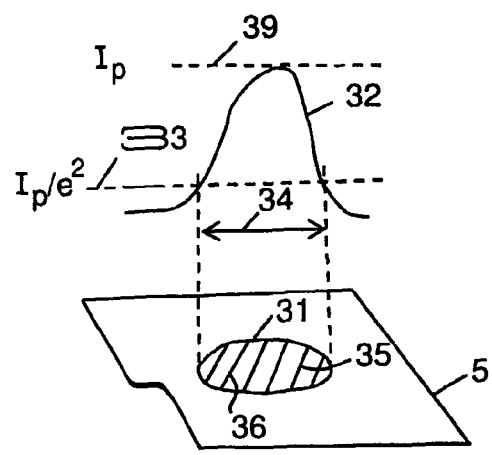
FIG. 3 shows a laser beam that has been focused onto a surface.

FIG. 3 shows a spot 31 formed by focusing the laser beam 4 onto the metal surface 5. The optical intensity 32 is the power per unit area of the laser beam 4. The optical intensity 32 varies across the diameter of the spot 31 from a peak intensity 39 to a $1/e^2$ intensity 33 and to zero. The diameter of the spot 31 is typically taken as the $1/e^2$ diameter 34, which is the diameter at which the optical intensity 32 falls to the $1/e^2$ intensity 33 on either side of the peak intensity 39. The area 35 of the spot 31 is typically taken as the cross-sectional area of the spot 31 within the $1/e^2$ diameter 34. FIG. 3 shows the optical intensity 32 varying with a Gaussian or bell-shaped profile. The optical intensity 32 may have other profiles, including a top hat profile that is substantially uniform within the beam diameter. Such a profile would be more efficient in producing a colour mark.

Pulse fluence 36 is defined as the energy per unit area of the pulse 21. Pulse fluence is typically measured in $J/cm^2$, and is an important parameter for laser marking because a mark is typically formed when the pulse fluence 36 is greater than a laser damage threshold of a material.

Figure 4:
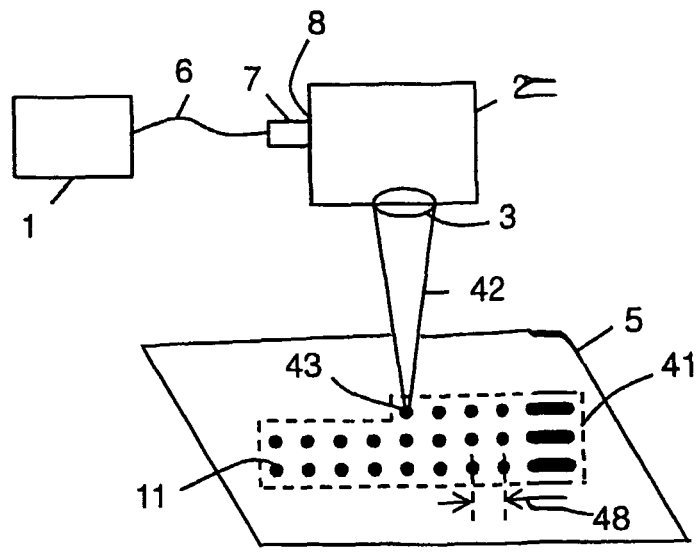
FIG. 4 shows a metal surface being marked with a first pattern.

A method to laser mark the metal surface 5 with a desired colour is shown with reference to FIG. 4. The method comprises forming at least one first pattern 41 on the metal surface 5 with a first laser beam 42 having a first pulse fluence 43, and then forming at least one second pattern 51, shown with reference to FIG. 5, on the metal surface 5 with a second laser beam 52 having a second pulse fluence 53. The second pattern 51 overlays the first pattern 41. The first pulse fluence 43 is arranged to be at least five times greater than the second pulse fluence 53. The colour of the mark 56 is given by the first and second pulse fluences 43, 53, and spot spacings 48 in the first and second patterns 41, 51. The method includes the step of selecting the first and second pulse fluences 43, 53 and the spot spacings 48 to form the desired colour. By "spot spacing", it is meant the distance from the centres of adjacent spots. The spot spacing 48 may be uniform, or may vary. The spot spacing 48 may be the same in different directions. The spot spacing 48 may be different in different directions. The spot spacing 48 may be the same in the first and the second patterns 41, 51 or may be different.

Figure 5:
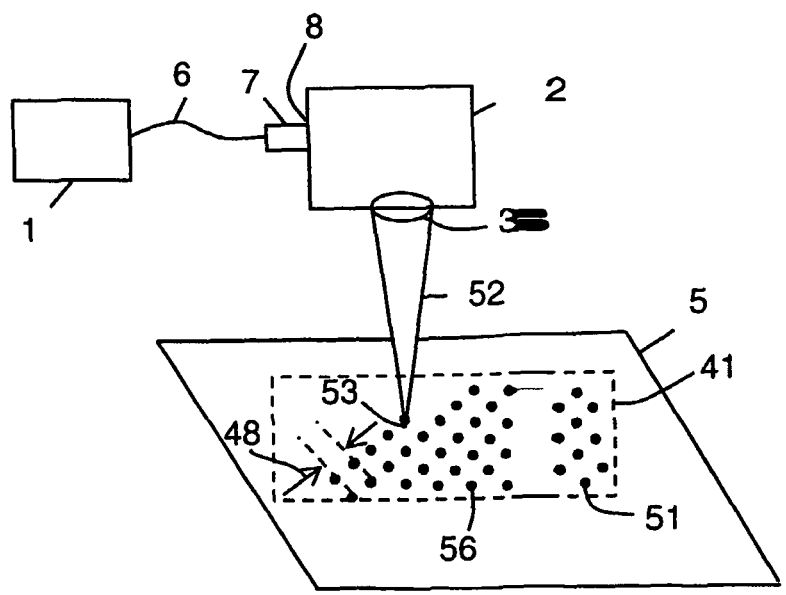
FIG. 5 shows the metal surface being marked with a second pattern which overlays the first pattern.

The laser 1 shown in FIGS. 4 and 5 can be the same laser or different lasers. It is usually preferred to use the same laser and to adjust the second pulse fluence 53 to be different from the first pulse fluence 43 by adjusting the peak power 22 of the laser 1. Alternatively or additionally, the second laser beam 52 can be defocused, or an objective lens 3 having a different focal length can be used.

The first pulse fluence 43 may be selected such that the first laser beam 42 melts the metal surface 5.

The metal surface 5 may be a surface of an alloy. The alloy may include copper. The alloy may be selected from tin bronze, phosphor bronze, aluminum bronze, brass, gunmetal, leaded gunmetal, nickel gunmetal, copper-nickel, nickel silver, and beryllium copper.

The first pulse fluence 43 may be greater than 5 $J/cm^2$. More preferably the first pulse fluence is greater than 10 $J/cm^2$. For certain colours, and increased processing speeds, it is preferable that the first pulse fluence is greater than 40 $J/cm^2$, These are useful ranges when marking copper alloys.

The second pulse fluence 53 may be such that it does not melt the metal surface 3 unless the metal surface 3 has been processed with the first laser beam 42.

The second pulse fluence 53 may be such that it ablates or texturizes the first pattern 41.

The second pulse fluence 53 may be less than 5 $J/cm^2$. More preferably, the second pulse fluence is less than 3 $J/cm^2$. For certain colours it is preferably that the second pulse fluence is less than approximately 1.5 $J/cm^2$.

Without wishing to limit the scope of the invention, it is currently believed that the first laser beam 42 melts the metal surface 5 of the alloy. The alloy then re-solidifies and separates (at least partly) into its component parts, either forming layers, or a graded surface. The second laser beam 52 then ablates away such layers or grading revealing different colours. For example, typical brass alloys comprise copper and zinc as their main components, but can also contain aluminum, tin, lead and iron, as well as other elements such as silicon. When melted, the alloy will resolidify, but in doing so, will not do so uniformly with depth. Further laser processing with the second laser beam 52 can now be achieved with a second pulse fluence 53 that is less than the first pulse fluence 43 to ablate or texturize the surface. This second processing yields unexpected and surprising new colours that have not hitherto been obtainable in copper alloys.

The metal surface 5 may not have been anodized.

The first laser beam 42 may be characterized by a pulse width 26. The pulse width 26 may be less than ten microseconds. The pulse width 26 may be greater than one hundred picoseconds. A range of pulse widths 26 from one hundred picoseconds to ten microseconds corresponds to pulses of sufficient width to melt the metal surface 5. When pulse widths such as ten picoseconds or one hundred femtoseconds are used, the metal surface 5 will be ablated but not heated. There will therefore be no subsequent separation of the constituent parts of the metal alloy and thus the second laser beam 52 will not produce the distinctive colours of the invention.

The characteristics of the second laser beam 52 can be different from those of the first laser beam 42. In particular the laser 1 can be a femtosecond laser or a picosecond laser because the second laser beam 52 is not required to melt the metal surface 5. Thus the laser 1 can be a pulsed carbon dioxide laser for forming the first pattern 41, and the laser 1 can be a femtosecond or a picosecond solid-state laser, or a femtosecond or a picosecond fibre laser, for forming the second pattern 51.

The second laser beam 52 may be characterized by a pulse width 26. The pulse width 26 may be less than ten microseconds. The pulse width 26 may be between one hundred femtoseconds and ten microseconds. The pulse width 26 may be between one picosecond and one hundred nanoseconds.

The first laser beam 42 may have a peak power 22 greater than 1 kW.

The second laser beam 52 may have a peak power 22 greater than 100 W.

The method may include the step of forming at least one of the first pattern 41 and the second pattern 51 more than once.

Figure 6:
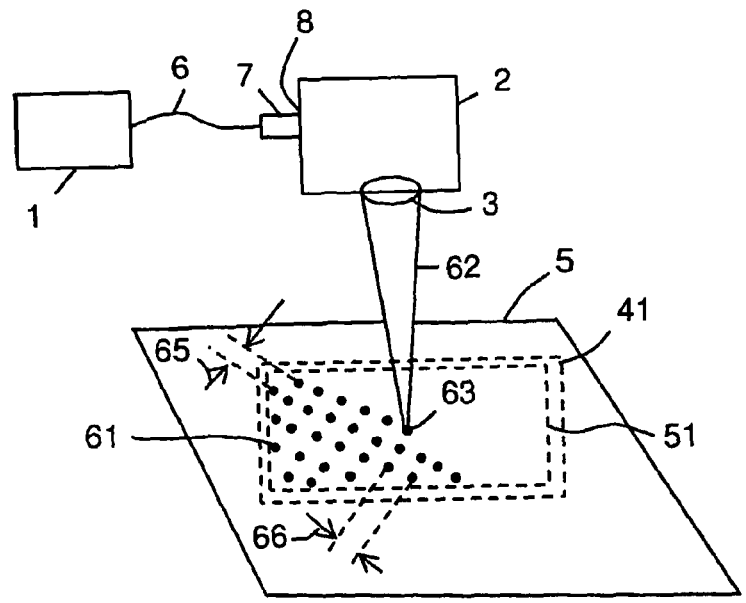
FIG. 6 shows the metal surface being marked with a third pattern which overlays the second pattern.

As shown with reference to FIG. 6, the method of the invention may include forming at least one third pattern 61. The method may include the step of forming the third pattern 61 on the metal surface 3 with a third laser beam 62 having a third pulse fluence 63. The third pulse fluence 63 may be less than the second pulse fluence 53. The third pattern 61 may overlay the first and the second patterns 41, 51. The third pattern 61 has a third line to line spacing 65 and a third spot to spot spacing 66.

Figure 7:
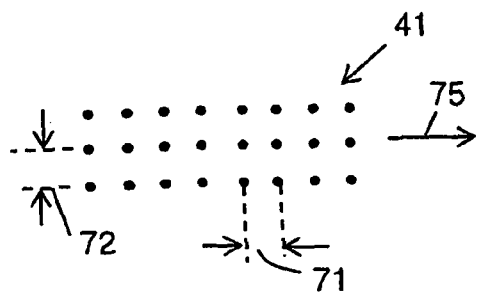
FIG. 7 shows a first pattern characterized by a first spot to spot spacing and a first line to line spacing.
Figure 8:
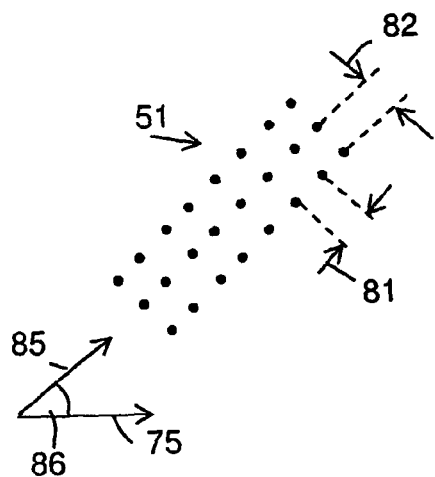
FIG. 8 shows a second pattern characterized by a second spot to spot spacing and a second line to line spacing.
Figure 9:
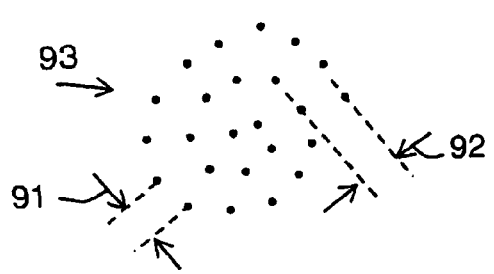
FIG. 9 shows a spiral characterized by a spot to spot spacing and a line to line spacing.

As shown with reference to FIGS. 7 and 8, the first and the second patterns 41, 51 may be characterized respectfully by a first and a second spot to spot spacing 71, 81, and a first and a second line to line spacing 72, 82. The first line to line spacing 72 may be greater than the second line to line spacing 82. The first and the second patterns 41, 51 shown in FIGS. 7 and 8 are known as hatching and the first and the second line to line spacings 72, 82 are sometimes known as the hatch spacing. Alternatively or additionally, at least one of the first and the second patterns may comprise a spiral 93 as shown with reference in FIG. 9. The spiral 93 may comprise a spot to spot spacing 91 and a line to line spacing 92. The various spot to spot spacings 71, 81, 91 and line to line spacings 72, 82, 92 have been shown as non-overlapping for convenience. Adjacent spots may overlap in order to provide uniform colour or may be separated.

The coloured mark may have a colour that is different from white, yellow, brown or black. Colours such as pink, blue, tangerine, purple, light brown, grey, and orange are able to be marked onto the surface of brass and other copper alloys using these processes. Such colours have not hitherto been able to be produced by laser marking copper and copper alloys without the use of dyes, inks or other chemicals. If desired, colours such as white, yellow, brown or black may be produced, these colours being those which are achievable by known laser marking methods for marking a metal surface.

The first and second patterns 41, 51 may be characterised by a first and second axis 75, 85 as shown in FIGS. 7 and 8 respectively. The first axis 75 may be in a different direction from the second axis 85. The first axis 75 may rotated from the second axis 85 by an angle 86 between 15° and 75°. Rotating these axes helps to prevent aliasing of the first and second patterns 41, 51 and thus can provide a more consistent mark.

The first and the second patterns 41, 51 may be uniform, or may vary by varying the first and second pulse fluences 43, 53, the first and second spot to spot spacings 71, 81, or the first and second line to line spacings 72, 82. The variation can be stepwise, or graduated. In this way, letters, numbers, logos, pictures, or artwork having a single colour or a variety of colours can be formed on the metal surface 3 in accordance with a method of the present invention.

The first, second and third patterns 41, 51, 61 may be formed in the presence of an assist gas (not shown). The assist gas may be nitrogen or argon, or may be oxygen or an oxygen rich gas. The assist gas may enable additional colours to be formed.

The metal surface 5 may be coated after being marked in order to improve its resistance to weather. Suitable coatings include varnishes.

EXAMPLE

The laser 1 shown with reference to FIGS. 4 and 5 was an air-cooled pulsed 20 W laser source, model G4 HS-L, manufactured by SPI Lasers UK Ltd of Southampton, England. The scanning means 2 was a galvanometric scan-head (called a scanner) model SuperScan II, manufactured by Raylase GmbH of Wessling Germany. The objective lens 3 was a 163 mm focal length f-theta objective lens. The first and the second laser beams 42, 52 were delivered from the laser 1 to the scanning means 2 via a 75 mm beam expanding collimator (BEC) 7 which enabled the laser beams to have a nominal diameter of 8 mm ($1/e^2$) at the scan head entrance 8. This allowed a laser beam waist diameter 34 of 50 μm +/−5.0 μm to be generated at the focal plane of the scanner objective lens 3. During normal operation of the workstation, the target metal surface 5 was placed at or near to this focal plane.

The laser 1 was capable of generating pulses in the nanosecond duration range (between approximately 5 ns to approximately 50 ns) and was operated over a range of average output power, laser pulse frequency and temporal pulse shape (which is referred to as a waveform for this type of laser). In this way the pulse energy 25 and pulse peak power 22 were able to be accurately controlled. The scanning means 3 was able to position the first and the second laser beams 42, 52 within a square working area and could rapidly move them from point to point, with speeds up to 6 m/s (for the specified focal length of scanner objective lens used in this case). The scanner speed was able to be accurately controlled so that when the laser 1 was operating at a known pulse repetition frequency, the number of laser pulses per unit length of movement could be calculated. Two dimensional areas were processed by scanning a series of parallel lines which spaced a pre-determined distance apart, as described with reference to FIGS. 7 and 8.

The metal surface 5 was the topside of a sample of brass grade CZ108. The top surface 5 of the sample material was positioned at the beam waist of the scanner objective lens 3 perpendicular to the lens axis. The first laser beam 42 was scanned over the metal surface 5 one or more times with a pre-determined combination of scan speed, laser pulse repetition frequency, temporal waveform, first pulse fluence 43, average output power 23 and first line to line spacing 72 (referred to as hatch spacing). The scan speed and the laser pulse repetition frequency 27 combine to give the first spot spacing 71 (measured from the centres of adjacent spots). The second laser beam 52 was then scanned over the metal surface 5 one or more times with a pre-determined combination of scan speed, laser pulse repetition frequency, temporal waveform, second pulse fluence 53, average output power 23 and second line to line spacing 82. The scan speed and the laser pulse repetition frequency 27 combine to give the second spot spacing 81 (also measured from the centres of adjacent spots). By varying the first and the second pulse fluences 43, 53, the first and the second line spacings 72, 82, and the first and the second spot spacings 71, 81, it was possible to create a range of coloured marks on the metal surface 5, many of which have never been created without the use of inks, dyes and other chemicals.

Additional colours, including shades thereof, were created by scanning a third laser beam 62 over the metal surface 5 one or more times with a pre-determined combination of scan speed, laser pulse repetition frequency 27, temporal waveform 24, third pulse fluence 53, average output power 23 and third line to line spacing 65.

By varying the above parameters, it was possible to create marks having white, black, yellow and brown colours, as well as colours such as pink, blue, tangerine, purple, light brown, grey, and orange. These latter colours are new colours for laser marking brass, which colours have never been produced before.

The first pulse fluence 43 was selected such that it would melt the metal surface 5. Preferably, the first pulse fluence 43 was greater than 10 J/cm$^2$. The first pulse fluence 43 used in this example was in the range 12 J/cm$^2$ to 45 J/cm$^2$. However the first pulse fluence 43 could be higher if a more powerful laser were used. The first spot to spot spacing 71 was in the range 0.8 micron to 50 micron, depending on which colour was desired. The first line to line spacing 71 was in the range 10 micron to 75 micron. The laser beam waist diameter 34 was approximately 50 micron. If a more powerful laser were to be used, a larger laser beam waist diameter 34 could be used, and a correspondingly larger first spot to spot spacing 71 and first line to line spacing 72.

The second pulse fluence 53 was selected to be approximately 1 J/cm$^2$, the second spot to spot spacing 81 was selected to be approximately 20 microns, and the second line to line spacing 82 was selected to be approximately 5 microns. These values are simply those used in this example, and are not intending to be limiting, and will vary depending upon the exact material, desired colour, laser, and laser focusing used. More generally, the second pulse fluence 53 should be at least five times less than the first pulse fluence 43. More preferably, the second pulse fluence 53 should be between 14 times and 36 times less than the first pulse fluence 43. The second pulse fluence 53 should preferably be less than the fluence required to melt the metal surface 5 prior to processing with the first laser beam 42.

The third pulse fluence 63 was selected to be approximately 0.6 J/cm$^2$, the third spot to spot spacing 66 was selected to be approximately 8 microns, and the third line to line spacing 65 was selected to be approximately 5 microns. These values are also not intending to be limiting and will also vary depending upon the exact material, desired colour, laser and focusing used. The third pulse fluence 63 is preferably less than the second pulse fluence 43, but may also be greater. The third pulse fluence 63 should preferably be less than the fluence required to melt the metal surface 5 prior to processing with the first laser beam 42.

The method of the invention is able to produce colours on the brass material through a range of processes. Without wishing to limit the scope of the present invention, it is believed that white and yellow colours are generated by melting and/or polishing the surface and possibly by changing the surface roughness of the sample. Further roughening the surface may cause light-trapping effects, which may result in darker colours such as black and brown. Other colours such as pink, blue, tangerine, purple, light brown, grey, and orange, may be produced by melting the brass using the first laser beam 42 to an extent that it separates into the constituent alloys (mainly copper and zinc). Since copper has a higher melting temperature compared to zinc and also has a higher density, several processing regimes are possible depending on the incident pulse parameters. After one or more pulses are incident on the material, it is possible for the brass to reach a localised temperature where the zinc melts but the copper does not. In another circumstance, it is possible to melt both the copper and zinc, and in this case the zinc will rise to the surface, having a lower melting temperature (and therefore staying in the liquid phase for longer) and being less dense. In such a case further laser processing by the second and the third laser beams 52, 62 may be used to remove the zinc layer to expose the copper layer. Furthermore, in any of the above descriptions, a chemical reaction may occur with either or both of these constituent elements due to the elevated temperatures caused by the laser beam absorption. in this manner it is possible to create a range of colours on the brass surface.

Similar experiments have been performed on other copper alloys. These experiments have also resulted in surprisingly vivid coloured marks being produced.

It is to be appreciated that the embodiments of the invention described above with reference to the accompanying drawings have been given by way of example only and that modifications and additional steps and components may be provided to enhance performance. Individual components shown in the drawings are not limited to use in their drawings and may be used in other drawings and in all aspects of the invention. The present invention extends to the above mentioned features taken singly or in any combination.

The invention claimed is:

1. A method for laser marking a metal surface with a desired colour, which method comprises:
 forming at least one first pattern on the metal surface with a first laser beam having a first pulse fluence, and then
 forming at least one second pattern on the metal surface with a second laser beam having a second pulse fluence characterized by
 causing the second pattern to be positioned entirely within the first pattern
 arranging the first pulse fluence to be at least five times greater than the second pulse fluence
 the colour being given by the first and second pulse fluences and spot spacings in the first and second patterns; and
 selecting the first and second pulse fluences and the spot spacings to form the desired colour.

2. A method according to claim 1 wherein the first pulse fluence is selected such that the first laser beam melts the metal surface.

3. A method according to claim 1 wherein the metal surface is a surface of an alloy.

4. A method according to claim 3 wherein the alloy includes copper.

5. A method according to claim 3 wherein the alloy is selected from tin bronze, phosphor bronze, aluminium bronze, brass, gunmetal, leaded gunmetal, nickel gunmetal, copper-nickel, nickel silver, and beryllium copper.

6. A method according to claim 1 wherein the metal surface is a non-anodized metal surface.

7. A method according to claim 1 wherein the first laser beam is characterized by a pulse width.

8. A method according to claim 7 wherein the pulse width is less than ten microseconds.

9. A method according to claim 7 wherein the pulse width is greater than one hundred picoseconds. .

10. A method according to claim 1 wherein the first laser beam has a peak power greater than IkW.

11. A method according to claim 1 wherein the second laser beam has a peak power greater than 100W.

12. A method according to claim 1 wherein the method includes the step of forming at least one of the first pattern and the second pattern more than once.

13. A method according to claim 1 wherein the method includes forming at least one third pattern on the metal surface with a third laser beam having a third pulse fluence.

14. A method according to claim 13 wherein the third pulse fluence is less than the second pulse fluence.

15. A method according to claim 1 wherein the first and the second patterns are characterized respectively by a first and a second spot to spot spacing, and a first and a second line to line spacing.

16. A method according to claim 15 wherein the first line to line spacing is greater than the second line to line spacing.

17. A method according to claim 1 wherein at least one of the first and the second patterns comprise hatching.

18. A method according to claim 1 wherein at least one of the first and the second patterns comprise a spiral.

19. A method according to claim 1 wherein the desired colour is pink, blue, tangerine, purple, or orange.

20. A method according to claim .1 wherein the first and second patterns are characterised by a first and second axis, and the first axis is in a different direction from the second axis.

21. A method according to claim 20 wherein the first axis is rotated from the second axis by an angle between 15° and 75°.

22. An article when marked according to the method claimed in claim 1.

* * * * *